United States Patent [19]

Lucien et al.

[11] 3,895,693

[45] July 22, 1975

[54] DISC-BRAKES WITH GRAPHITE FRICTION LININGS

[76] Inventors: Rene Lucien, Neuilley-sur-Seine; Jean Masclet, Paris, both of France

[22] Filed: June 14, 1973

[21] Appl. No.: 370,056

Related U.S. Application Data

[63] Continuation of Ser. No. 114,476, Feb. 11, 1971, abandoned.

[30] Foreign Application Priority Data

Feb. 12, 1970  France .............................. 70.05033
June 18, 1970  France .............................. 70.22507

[52] U.S. Cl. ............ 188/71.1; 188/71.5; 188/73.2; 188/218 X L; 188/251 A; 192/70.14; 192/107 R

[51] Int. Cl. ... F16d 55/00; F16d 69/02; F16d 69/04

[58] Field of Search ........ 188/73.2, 218 KL, 251 A, 188/251 R, 71.5, 71.1; 192/107 R, 107 M, 70.11, 70.14

[56] References Cited

UNITED STATES PATENTS

| | | | |
|---|---|---|---|
| 2,093,324 | 9/1937 | Lansing | 192/107 M X |
| 2,356,258 | 8/1944 | Martin | 188/73.2 X |
| 3,469,658 | 9/1969 | Forsythe | 192/107 R X |
| 3,473,637 | 10/1969 | Rutt | 188/251 R |
| 3,605,967 | 9/1971 | Warren et al. | 192/107 R |

*Primary Examiner*—George E. A. Halvosa
*Attorney, Agent, or Firm*—Haseltine, Lake & Waters

[57] ABSTRACT

Friction linings of disc brakes which are wholly or partly constituted by a plurality of graphite plates, each plate being delimited by a cylindrical surface and being housed in a recess of a rotating structure or stationary structure, each recess having a flat bottom and having a depth less than the thickness of the plate, each recess being delimited by a cylindrical surface parallel to the cylindrical surface of the plate, the space between said two cylindrical surfaces being greater than the space necessary for the thermal expansions and contractions in operation, and each plate being held in its recess by appropriate means, for example by a rivet passing through the plate with a radial clearance.

10 Claims, 9 Drawing Figures

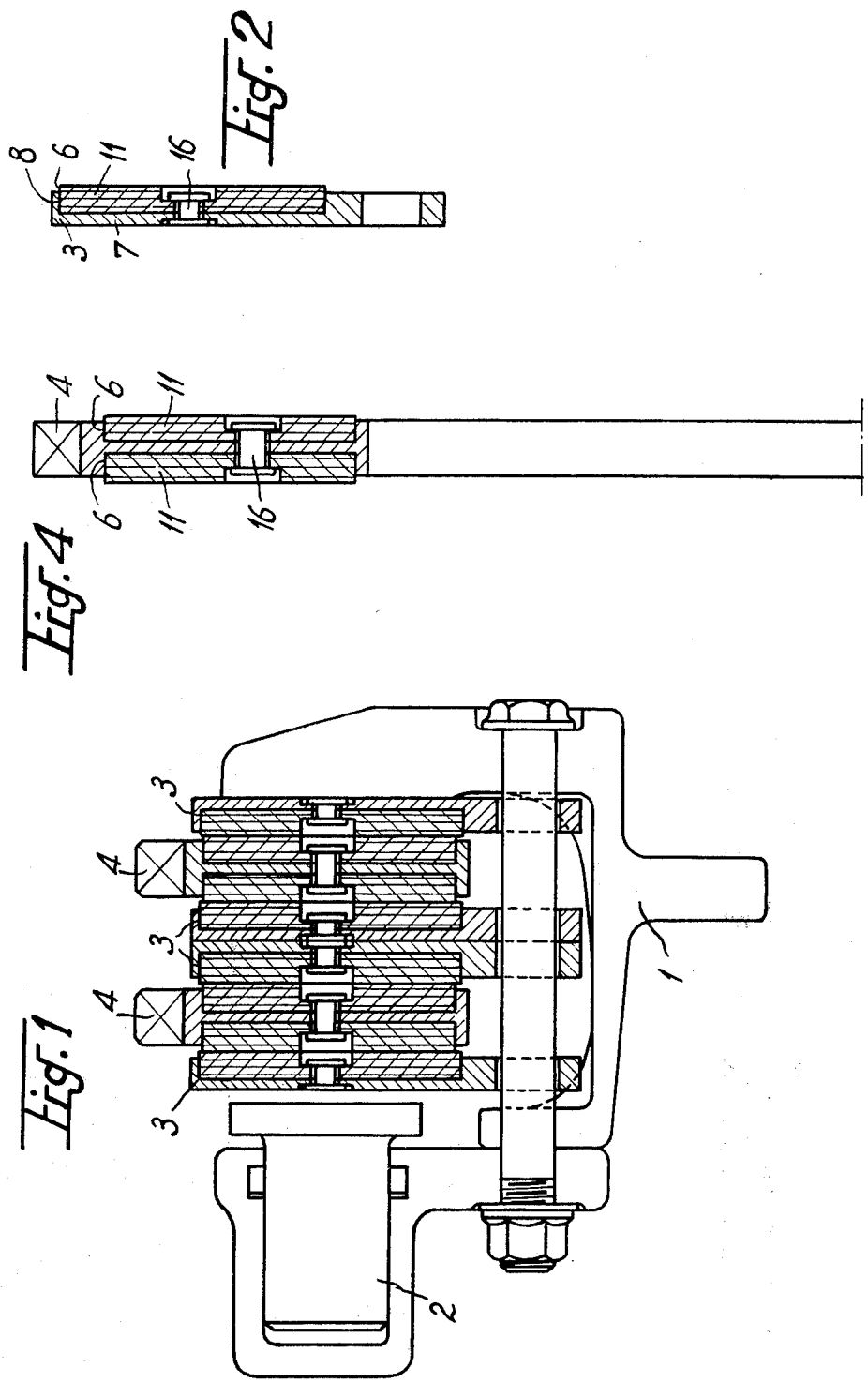

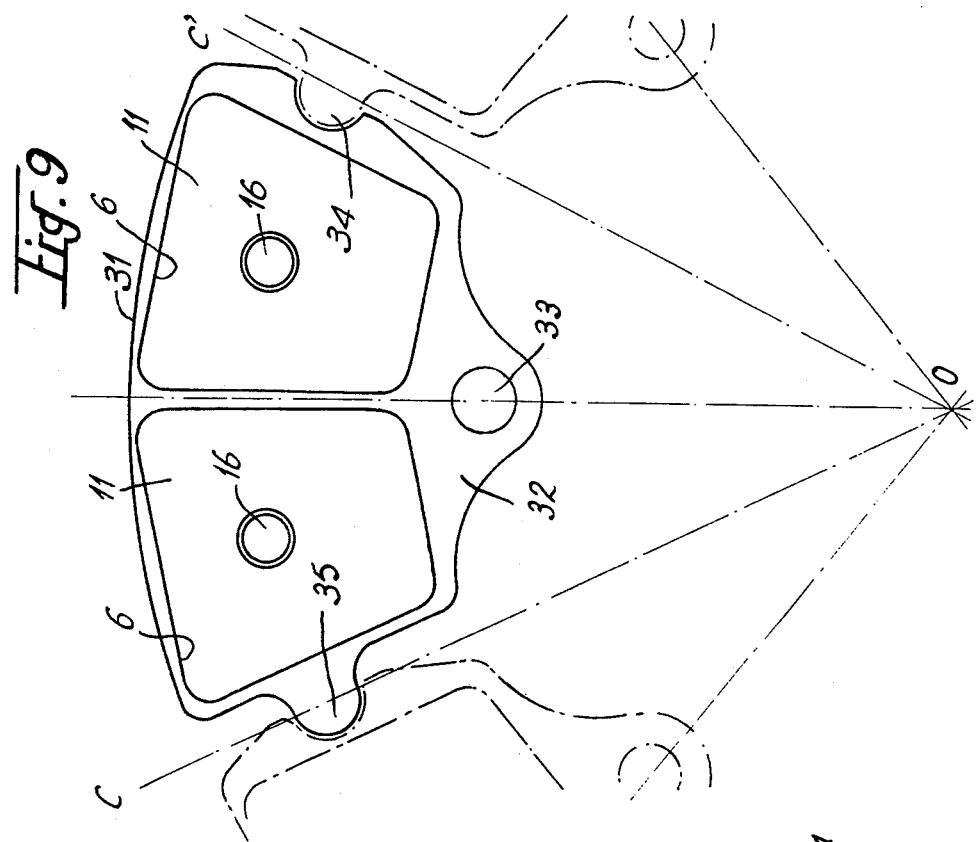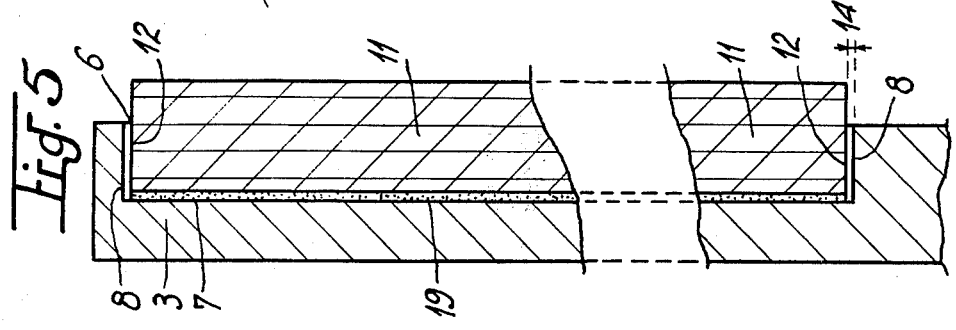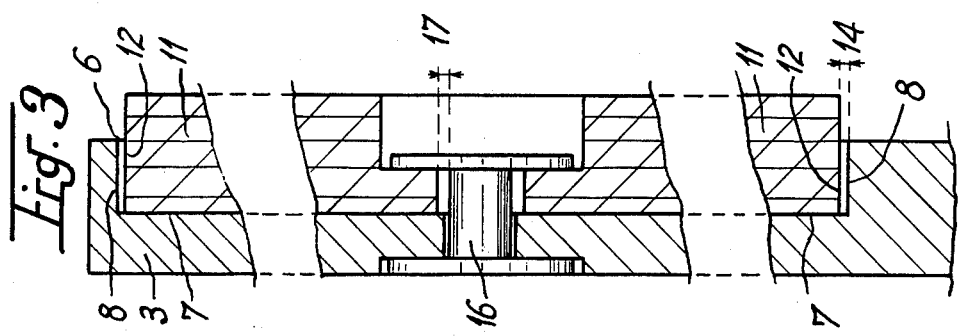

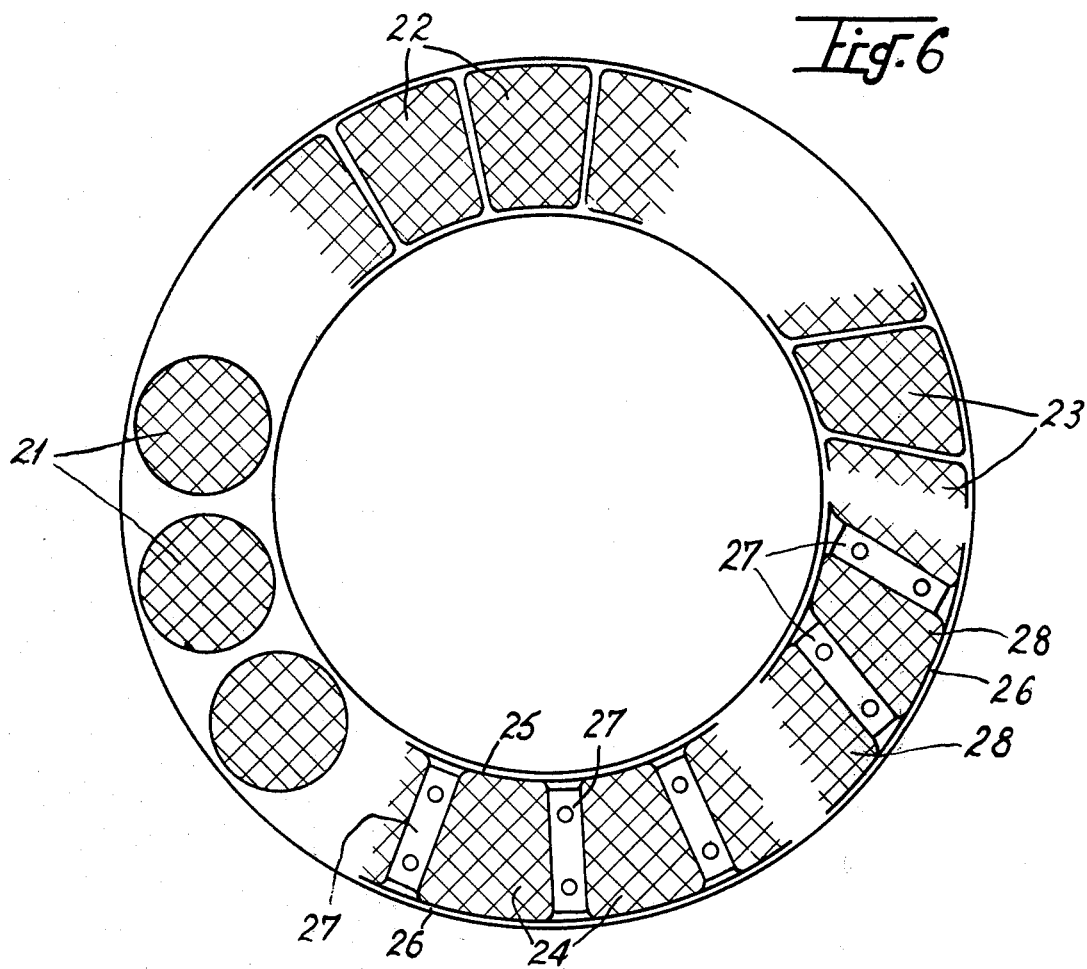

DISC-BRAKES WITH GRAPHITE FRICTION LININGS

CROSS RELATED APPLICATION

This Application is a continuation of co-pending application Ser. No. 114,476 filed Feb. 11, 1971 now abandoned. This Application claims the priority of the applications filed in France on Feb. 12, 1970 and June 18, 1970. Said Applications having been made the subject of a priority claim in the co-pending parent Application.

The present invention relates to disc-brakes in general and more particularly to friction linings of these brakes, fitted on the members which are rotatable (or rotors) and non-rotatable (or stators), which, by their mutual friction generate the braking force and transform practically the entire kinetic energy into heat, the said linings also playing the part of a heat sink.

The development of technical knowledge of friction brakes has led during the last few years to a considerable development of disc-brakes.

In the aeronautical industry in which disc-brakes are very widely used and must comply with constantly increasing performance requirements, technical progress in respect of heat sinks has consisted mainly in trying to obtain at the same time increasing reductions in weight and an increasingly high permissible temperature.

To this end it has already been proposed to utilize discs (rotating and/or non-rotating) of carbon, for example of graphite, due to the inherent advantages of these materials from the two-fold point of view of weight and the remarkable admissible temperature. However, these materials have only fair mechanical properties. In consequence, the manufacture of rotors and stators wholly of graphite presents problems which are difficult to resolve, due to the fact that the transmission by these graphite parts of the forces produced during friction often causes fracture of these parts.

With regard to the said anchorage in rotation, it has already been proposed either to adhere the graphite disc on a metal disc, or to provide the graphite disc with metallic rings forming a binding hoop or a body of a festoon shape. However, these assemblies are heavy, fragile and costly.

The present invention has for its object to eliminate the said difficulties and the said drawbacks, and to provide an essentially different solution to the said problems.

According to the invention, the said friction linings and heat sinks are wholly or partly constituted by a plurality of graphite plates, each plate being delimited, between two flat parallel surfaces spaced apart by the thickness of the plate, by a cylindrical surface, the generator lines of which are perpendicular to these two flat surfaces, each plate being housed in a recess in the rotating structure or the non-rotating structure, each recess having a flat bottom and being less deep than the said thickness of the plate, each recess being formed by a cylindrical surface parallel to the said cylindrical surface of the plate, the space between these two cylindrical surfaces being greater than the space necessary for the thermal expansions and contractions during service, and each plate being held in its recess by suitable fixing means, for example by a flush-head rivet coming from the bottom of the recess and passing through the plate with a radial clearance greater than the said space between the two cylindrical surfaces.

Thus, under the action of the braking torque, each graphite plate is supported by its cylindrical surface against the cylindrical surface of its recess, that is to say by means of surfaces which are sufficiently large to transmit the braking torque with a sufficiently moderate pressure which is thus compatible with the low mechanical properties of the graphite, which is furthermore caused to work exclusively in compression, in which state its properties are not so low.

According to another arrangement of the invention each graphite plate is fixed in its recess by adhesion, for example by sticking, by welding, by means of a prior coating metallizing the graphite, by an intermediate layer of a graphite having transitional properties.

For rotating and non-rotating structures, the invention also comprises their construction of metal, for example of steel, copper, beryllium, titanium, aluminum and their alloys and also of any material having appropriate mechanical properties and density, including certain varieties of graphite which differ more or less considerably from conventional graphite.

It is specified that the said graphite plates in their recesses may be provided, depending on questions of choice or opportunity, on the stator or on the rotor of the brake. The stator and the rotor are preferably but not necessarily both so equipped according to the invention.

On the other hand, amongst the qualities which are required in a brake, one is important, and this is the law of the braking torque as a function of the speed, or of the temperature of the hot parts of the brake, or of time. Depending on the applications, it may be desired to obtain a constant braking torque for a given pressure, irrespective of the conditions of speed or temperature, or alternatively it may be desired to obtain a law of the torque as a function of the speed or temperature.

The invention has also for its object to meet this requirement.

In consequence, the invention has again for its object the utilization, in a brake having a heat sink of at least two types of friction shoes, the properties of which are different but are combined so as to obtain a predetermined law of braking torque.

For example, it is possible to equip the stators with one type of graphite shoe and the rotors with another type, the friction of one on the other resulting in the desired torque, as a function of the speed or of the temperature of the heat sink.

The said combination can also be effected between the stator and rotor themselves. Thus, each segment of a stator may be equipped with two different types of graphite shoes, and each rotor may also be equipped with two different types of graphite shoes. Generally speaking, all forms of combination can be obtained depending on the result desired. It is also possible to associate in the brake, graphite friction shoes and friction shoes made of other materials, such as for example steel, copper, and their alloys.

The invention and its embodiments will now be described with reference to the accompanying drawings, given by way of non-limitative examples. In these drawings:

FIG. 1 is a radial cross-section showing the general arrangement of a disc-brake;

FIG. 2 is a radial section of a stator disc, and FIG. 3 is an explanatory detail of this disc on a larger scale, with parts broken away;

FIG. 4 is a radial cross-section of a rotor disc;

FIG. 5 is a radial cross-section of another stator disc;

FIG. 6 is a front view of a disc showing various forms of graphite plates.

FIG. 9 is a front view of a repetition segment of a stator.

Figure 7:
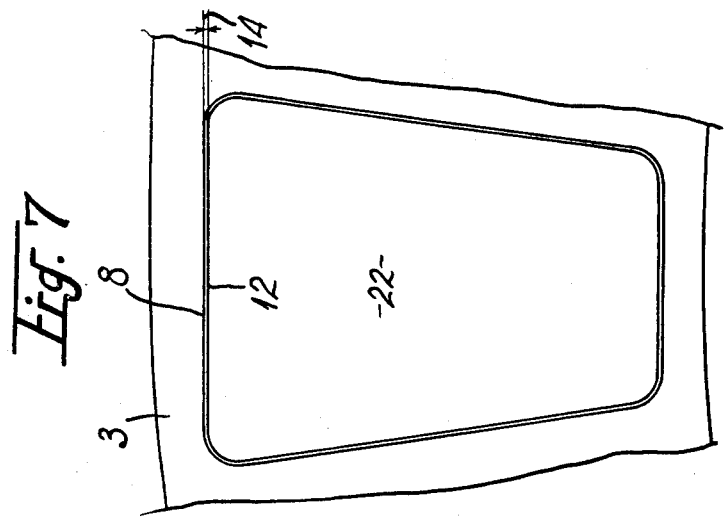
FIG. 7 is a detail of one of these plates, to a larger scale.

The present embodiment of the invention comprises a heat sink of a disc brake, in which there are employed graphite plates which serve as friction parts and heat sinks, these plates being assembled on a metal armature the function of which is the transmission of the forces generated by the friction. With reference to FIG. 1, the brake comprises a framework 1 provided with jacks 2 which apply the pressure forces. The heat sink is composed of stators 3 and rotors 4, both stators and rotors being equipped with graphite plates rubbing against each other. The heat sink is therefore constituted by the stators and rotors serving as supports for the graphite plates and by the graphite plates themselves, following a distribution which is a function of the respective masses and the respective specific heats of the rotors or stators and of the graphite plates.

With reference to FIG. 2, which is a radial crosssection of a stator disc according to the invention, and to FIG. 3 which is an explanatory detail of this disc with parts broken away, in the stator 3 are arranged recesses 6 with flat bottoms 7, each delimited by a cylindrical surface 8, described later, the generator lines of which are perpendicular to the stator 3. Each recess 6 receives a graphite plate 11 having two flat parallel surfaces and a perpendicular cylindrical surface 12. This surface 12 is parallel to the surface 8 of the recess with a predetermined space 14 between these two surfaces which is greater than the space required for the heat expansions and contractions during operation. In this embodiment of the invention, each graphite plate 11 is held in the recess 6 by a rivet 16 which passes through the plate 11 with a radial clearance 17 greater than the above-mentioned space 14.

Thus, the graphite plate 11 can move slightly inside its recess 6. During braking, this displacement enables the graphite plates 11 to come into contact, each with the edges of its recess. This enables the forces generated by the friction to be transmitted from the graphite plates 11 to their metallic armatures, mainly in compression, for which the strength of the graphite is a maximum. To this end, the graphite plates 11 are suitably sunk in the recesses 6 of the armature, the slight projection of each plate 11 from the recess 6 being sufficient to ensure the graphite to graphite friction, due to the very low rate of wear of the surfaces in contact.

The structure which has just been described by means of FIGS. 2 and 3 with reference to a stator disc is of course applicable to a rotor disc, as will be quite obvious to those skilled in the art.

With reference to FIG. 4, this construction of a rotor disc is similar to that which has just been described, but the recesses 6 and the graphite plates 11 are arranged back to back on the two faces of the disc 4, and two plates 11 back to back are held by a single rivet 16 which leaves each plate 11 the possibility referred to of displacement in its recess 6 by means of the said radial clearance 7 between the rivet 16 and the plate 11, this clearance being greater than the space 14 between the plate 11 and the recess 6.

Referring now to FIG. 5, in this embodiment of the invention, each graphite plate 11 is fixed on the bottom 7 of its recess 6 by adhesion 19, for example by sticking, welding, metallization pre-coating, intermediate coating of graphite having transitional properties.

There will now be described various forms of the parallel cylindrical and very close surfaces 8 of the recesses 6 and 12 of the graphite plates 11, reference being made to FIGS. 6, 7, 8 and 9.

With reference to FIG. 6, this front view shows diagrammatically various forms of these surfaces. The plates 21 are circular, the plates 22, of which one is shown in detail in FIG. 7, are trapezoidal, with two curvilinear sides and two rectilinear sides located along the radii.

In order to ensure the progressive coming into contact of the edges of the opposite graphite plates (rubbing against each other), the invention provides for the said rectilinear sides to be inclined with respect to the radii, at least for one set of the plates, as shown at 23. On the other hand, the recesses according to the invention may be formed in the mass, for example by rolling, as shown for the circular plates 21 in FIG. 6 and the trapezoidal plates 22 (FIGS. 6 and 7) and 23 (FIG. 6). These recesses may be constituted as shown in FIG. 6 by two circular collars 25 and 26 and by straps 27, screwed, riveted or welded as shown, for the trapezoidal plates 24 with edges located along the radii and for the trapezoidal plates 28 with edges inclined with respect to the radii.

FIG. 7 shows the said space 14 to a larger scale, all round the graphite plate, between its cylindrical surface 12 and the cylindrical surface 8 of its recess 6. These surfaces are in this case trapezoidal with considerably rounded angles.

Figure 8:
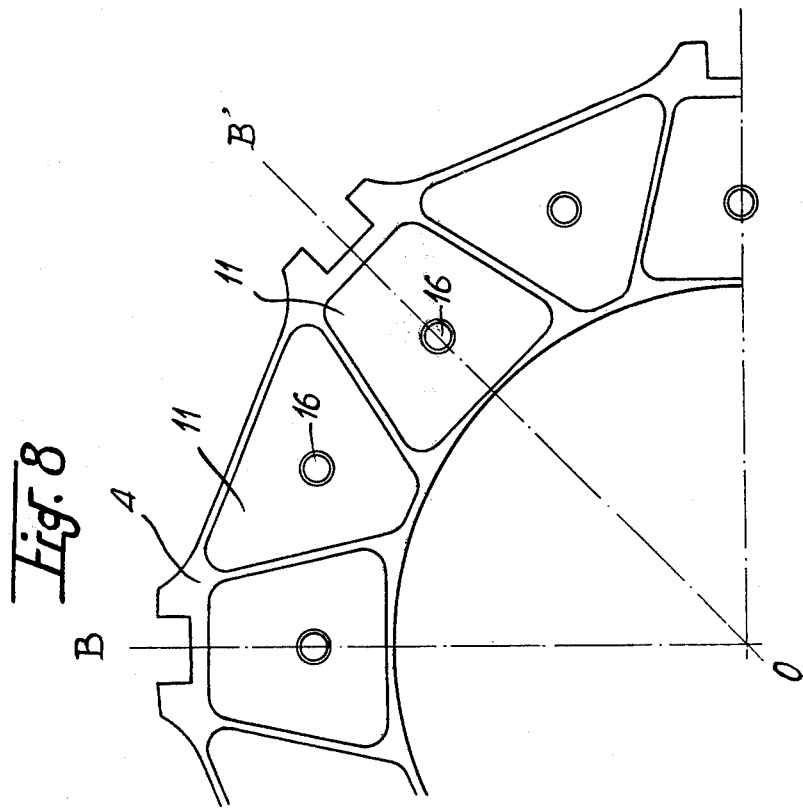
FIG. 8 is a front view of a repetition segment of a rotor.

With reference to FIG. 8, which shows a repetitive segment BOB' of one example of construction of a rotor according to the invention, the rotor 4 is composed of a metallic armature comprising recesses on its two faces, in which are housed graphite plates 11. Each plate comprises a central hole which permits its fixing by means of rivets 16, a single rivet serving in this case to assemble two plates back to back on each face of the armature, as already described with reference to FIG. 4.

This type of rotor is of course only given by way of non-limitative example. The number and the shape of the plates in each segment BOB' may vary in accordance with questions of choice or opportunity.

With reference to FIG. 9, which represents a repetitive angular segment COC' of a stator according to the invention, the stator has the shape of a ring composed of a variable number of segments 31, supported against each other in a manner known for example from French Pat. No. 1,301,317 and its Addition No. 87,527.

Each segment 31 is composed of a metallic armature 32, of two graphite plates 11 housed in recesses 6 provided for that purpose in armature 32, and of two rivets 16 serving to fix the graphite plates 11 of the armature 32, as already described with reference to FIG. 2. In a manner known in itself from the above-mentioned patent and Addition, the armature 32 comprises a lug pierced with a hole 33 serving for the transmission of the torque generated by friction, the frame of the brake. This armature is also provided with a slot 34 and a lug 35 serving to connect to each other the segments 31 of the same stator. The lug of a segment fits into the slot of the adjacent segment, the assembly being closed and constituting a segmented ring.

This kind of construction of the stator is only given by way of example and without limitation; the number of recesses in each segment may be variable as may also their geometrical shape.

With regard to the metal forming the armature of the schments and the rotors, this may be different depending on the desired gain in mass.

By way of example, a heat sink of graphite according to the invention makes possible, under identically the same conditions of service and with respect to a conventional sink of steel, a gain in mass of:
45 percent with armatures of steel,
70 percent with armatures of beryllium.

If these values are referred to the level of the mass of the brake, the gain is then:
30 percent with a steel armature,
54 percent with a beryllium armature.

What we claim is:

1. A disk brake comprising a rotating and a non-rotating structure, both structures having facing surfaces and comprising friction linings on said facing surfaces capable of rubbing against each other, said friction linings of the two structures each being composed of a plurality of graphite plates, each of the said graphite plates having two parallel plane surfaces and a flat side surface having generatrices extending perpendicular to the two plane surfaces, said plates being housed in respective recesses in the structures and having a flat bottom, each recess having a depth less than the thickness of the respective plate, each structure including a disk element with a rim surrounding the associated recess and having a side face parallel to the said flat side surface of the associated plate, and means for securing each plate in its recess comprising a single rivet passing through each plate with radial clearance and secured to said disk element, said plate being secured in their recesses with a clear circumferential space formed with said rim.

2. A disk brake as claimed in claim 1 wherein at least one of said structures includes a disk having recesses in back-to-back relation with a respective plate in said recess, said plates facing respective friction linings on the other of the structures, each rivet including opposite heads each recessed in a cavity in a respective plate whereby the plates are secured in the associated structure in pairs.

3. A disk brake as claimed in claim 1 wherein said radial clearance between said single rivet and the plates is greater than the radial dimension of the space between the plates and the surrounding rim to enable the plates to move within the recess and come into contact with the surrounding rim during braking.

4. A disk brake as claimed in claim 1 wherein the said flat side faces of the recesses and the flat side surfaces of the graphite plates are circular.

5. A disk brake as claimed in claim 1 wherein said flat side faces of the recesses and the flat side surfaces of the plates are trapezoidal with rounded corners.

6. A disk brake as claimed in claim 5 wherein the plates are arranged in an annular array in each friction lining, at least the trapezoidal faces of the plates of one of the said two structures has straight sides inclined at an angle with respect to radial lines drawn from a center of the annular array whereby to effect gradual contact of the edges of the graphite plates which come into frictional contact with one another.

7. A disk brake as claimed in claim 5 wherein said structures include fixed members having straight sides bounding the recesses for the trapezoidal plates.

8. A disk brake as claimed in claim 7 wherein said plates of at least one of said two structures are at an angle relative to radial lines drawn from the disk center.

9. A disk brake as claimed in claim 1 wherein said plates are made of at least two kinds of graphite.

10. A disk brake comprising a rotating and a non-rotating structure, at least one of said structures being made of steel, copper, beryllium, titanium, aluminum, alloys thereof, graphite, or complexes thereof, both structures having facing surfaces and comprising friction linings on said facing surfaces capable of rubbing against each other, said friction linings of the two structures each being composed of a plurality of graphite plates, each of the said graphite plates having two parallel plane surfaces and a flat side surface having generatrices extending perpendicular to the two plane surfaces, said plates being housed in respective recesses in the structures and having a flat bottom, each recess having a depth less than the thickness of the respective plate, each structure including a disk element with a rim surrounding the associate recess and having a side face parallel to the said flat side surface of the associated plate, and means for securing each plate in its recess comprising a single rivet passing through each plate with radial clearance and secured to said disk element, said plates being secured in their recesses in spaced relation with said rim.

* * * * *